United States Patent
Creamer et al.

(12) 
(10) Patent No.: US 6,773,500 B1
(45) Date of Patent: Aug. 10, 2004

(54) FIBER REINFORCED AERATED CONCRETE AND METHODS OF MAKING SAME

(75) Inventors: Steve R. Creamer, Salt Lake City, UT (US); Bruce Boggs, Kennesaw, GA (US); Robert M. Bergman, Cartersville, GA (US); Ryan Creamer, Salt Lake City, UT (US)

(73) Assignee: ISG Resources, Inc., South Jordan, UT (US)

( * ) Notice: Subject to any disclaimer, the term of this patent is extended or adjusted under 35 U.S.C. 154(b) by 202 days.

(21) Appl. No.: 09/871,089

(22) Filed: May 31, 2001

Related U.S. Application Data

(60) Provisional application No. 60/208,247, filed on May 31, 2000.

(51) Int. Cl.⁷ .................. C04B 16/08; C04B 18/04; B28B 1/14; B28B 1/50; B29C 67/20
(52) U.S. Cl. ................. 106/672; 106/677; 106/679; 106/680; 106/703; 106/711; 264/42; 264/234; 264/333
(58) Field of Search .................... 106/672, 677, 106/679, 680, 703, 711; 264/42, 234, 333

(56) References Cited

U.S. PATENT DOCUMENTS

| | | | |
|---|---|---|---|
| 4,077,809 A | 3/1978 | Plunguian et al. | |
| 4,088,808 A | 5/1978 | Cornwell et al. | |
| 4,210,457 A | 7/1980 | Dodson et al. | |
| 4,453,978 A | 6/1984 | Okimura et al. | |
| 4,613,627 A | 9/1986 | Sherman et al. | |
| 4,828,618 A | 5/1989 | De Chiffre et al. | |
| 5,250,578 A | * 10/1993 | Cornwell | 521/83 |
| 6,203,609 B1 | * 3/2001 | Castro et al. | 106/705 |

* cited by examiner

Primary Examiner—Elizabeth D. Wood
(74) Attorney, Agent, or Firm—Wegman, Hessler & Vanderburg

(57) ABSTRACT

Fiber reinforced aerated concrete compositions and methods of forming structural units such as blocks, panels, etc., from such compositions are disclosed. The compositions comprise a fly ash/cement slurry with a coated Al paste serving as the activator to generate the desired cellular structure. The composition can be self cured at ambient temperature and pressure without the need for ovens or autoclaves. The cured compositions can be easily cut into the desired shape by a band saw or the like.

15 Claims, 3 Drawing Sheets

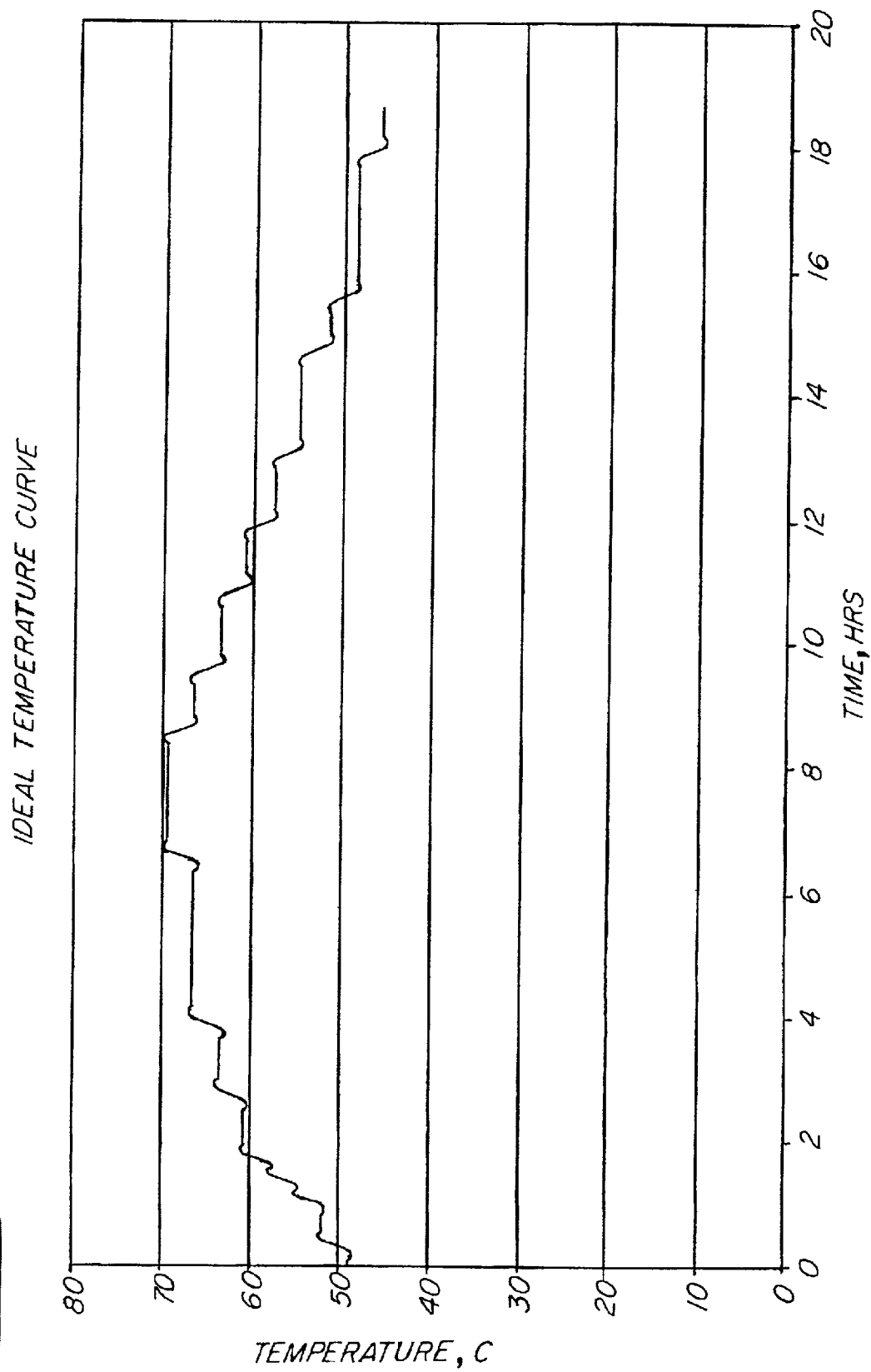

FIBER REINFORCED AERATED CONCRETE AND METHODS OF MAKING SAME

CROSS REFERENCE TO RELATED APPLICATION

The benefit of prior U.S. Provisional Application No. 60/208,247 filed May 31, 2000 is hereby claimed.

FIELD OF THE INVENTION

The invention pertains to a process for creating low cost fiber reinforced aerated concrete and to compositions for such concrete.

BACKGROUND OF THE INVENTION

The prior art has generally centered on production of either autoclave aerated cellular concrete (AAC) or variations thereof to produce a lightweight concrete with good strengths for use as building blocks or panels. Alternately, prior art has been identified that can produce a fiber reinforced cellular concrete using either Al or foam. AAC processes rely on expensive autoclave equipment to cure a mixture of cement, sand, lime and other materials that have been aerated by the reaction of powdered Al and high pH cement/lime. Various other processes have been proposed with systems based upon the use of aerating and other agents and casting forms to produce the desired shape of material or cutting the uncured material with wires. Most of these processes rely on a high percentage of cement in the mixture to achieve the desired product strength.

SUMMARY OF THE INVENTION

The system disclosed herein produces fiber reinforced aerated concrete in a variety of precise shapes through the application of a unique process. The compositions incorporate the use of a high percentage of low cost coal fly ash, cement, selected fiber materials, other reagents, and selected activating reagents to produce fiber reinforced aerated concrete. The process combines and thoroughly mixes these materials with water in a high-speed dispersion mixer. The mixture is then placed in a mold and cured for 12–24 hours at naturally elevated temperatures generated by chemical reactions taking place in the monolithic mass. Following additional curing of 1–2 days, the material is cut into precise block or panel shapes by sawing. The sawn materials are then shipped to the construction site for assembly using standard aerated concrete joining techniques.

The present invention will be explained further in conjunction with the appended drawing and the following detailed description.

BRIEF DESCRIPTION OF THE DRAWING

FIG. 3 is a time/temperature curve showing ideal curing conditions for the slurry.

DETAILED DESCRIPTION OF THE PREFERRED EMBODIMENT

Figure 1:
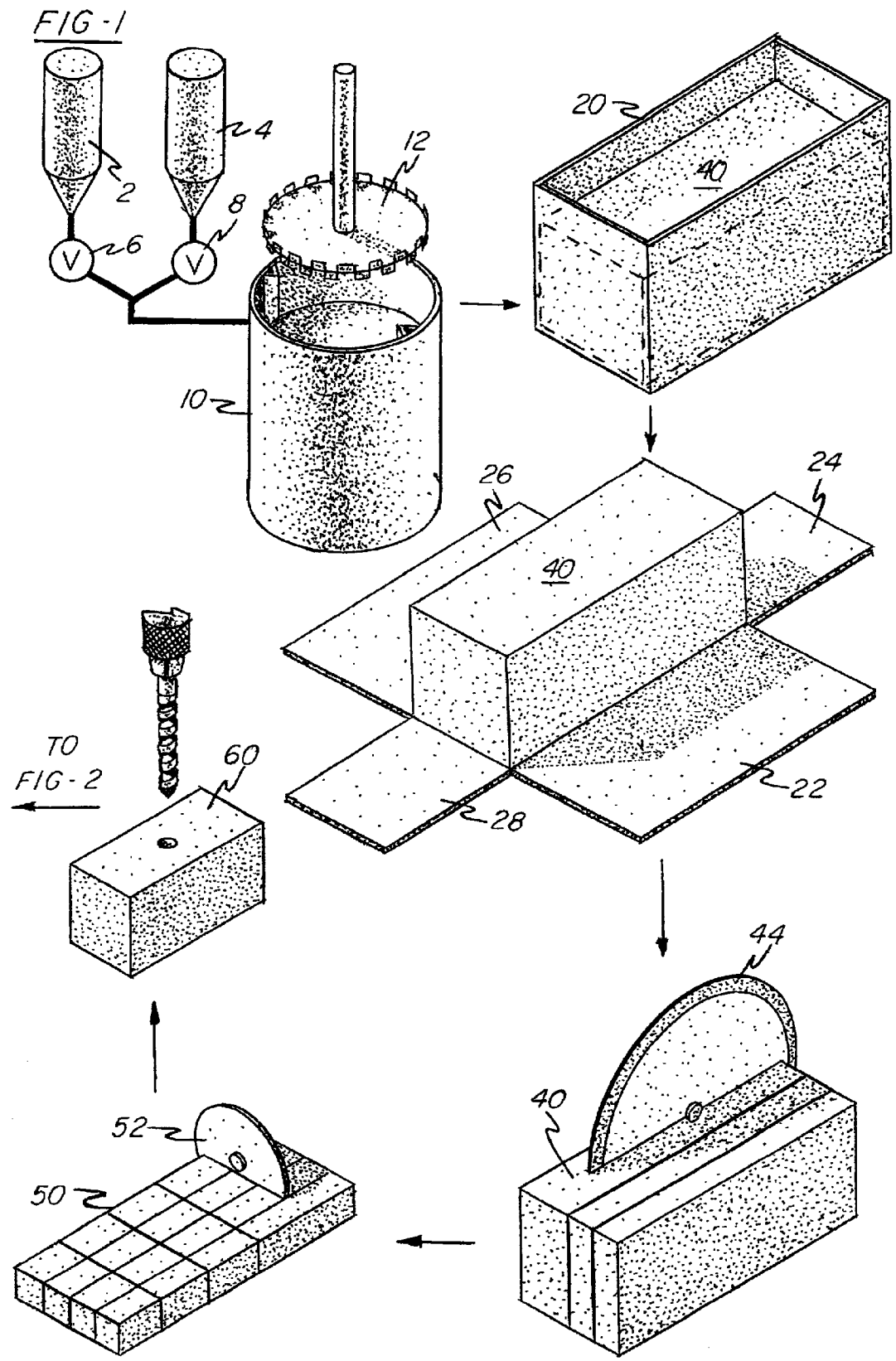
FIG. 1 is a schematic process step drawing illustrating the steps utilized to make blocks of the fiber reinforced aerated concrete in accordance with the invention.
Figure 2:
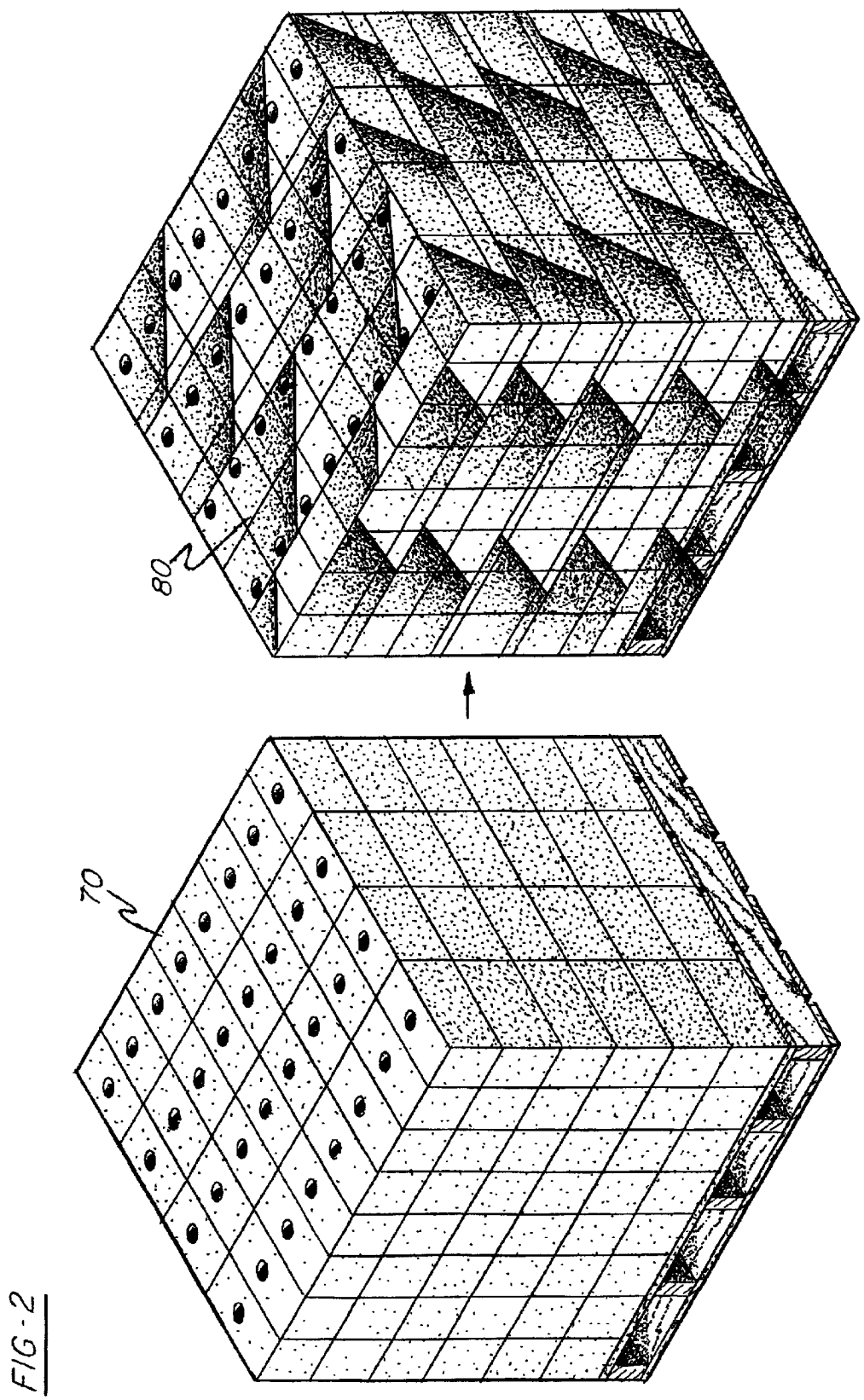
FIG. 2 is a schematic process drawing showing the process steps that follow the ones depicted in FIG. 1.

The fiber reinforced cellular concrete mixture is made up of the following materials:

|  | Exemplary | Preferred |
| --- | --- | --- |
| Fly ash | 20–70% | 45–70% |
| Portland Cement | 10–50% | 25–50% |
| Reinforcing Fibers | .001–2.00 | .005–.020 |
| Activating Agent | .0001–2.00 | .001–.020 |

The foregoing add up to 100 wt % of the non-aqueous components of the mix. Water is added in an amount about 20–60 wt % based on the combined weight of nonaqueous components.

Additional reagent materials can be added to the mixture if desired to promote various product qualities, including lime, gypsum, plaster of Paris, sodium silicate, and industry accelerators and polymers. Each of these additional reagent components may be added in an amount of about trace—2.0 wt %, preferably about 0.25–4% of the total non-aqueous component portion of the mixture. The addition of these materials can reduce cure time and increase product strength.

The activating reagent is made up of fine grained Al metal (95%-325 mesh) in a paste form to coat the Al to prevent oxidation of the Al so as to preserve its reactivity. The preferred Al paste is available from Silberline, Mfg. Co., Tamaqua, Pa., under the "Flexcrete Aerating Agent" designation. This product includes fine Al particles (325 mesh) in a paste mixture with mineral spirits and diethylene glycol. We have found that it is beneficial to add a small amount of water of from about 1–6%, preferably 2–4% to the paste.

A host of different surfactants or foam builders can be used as part of the activator component. Ethylene glycol may be used as one of the activator components. Additionally, the surfactant or foam builder may contain as a component either "Geofoam Liquid" or "Meacel 3532" both available from Engelhard. The former comprises hexylene glycol, ferrous sulfate heptahydrate, and 2-butoxyethanol as a component on its MSDS sheet. The latter includes 2-butoxyethanol as a component.

Other surfactants such as the alpha olefin sulfonates, vinsol resins (pinewood extracts), sodium lauryl sulfates, and condensation products of ethylene oxide and alkyl phenols can also be mentioned as exemplary components of the activating agent.

Generally, the surfactants are used when a high LOI fly ash component is used. High amounts of carbon retard the reaction between Al and cement and make the product unstable through the initial curing stage, and product collapse can occur. At present, it is preferred to use a non-ionic surfactant such as nonylphenol polyethylene glycol ether available from PB&S Chemical, Henderson, Ky. Accordingly, the compositions in accordance with the invention can incorporate a myriad of different fly ash types.

Additional reagents can be added to the activating reagent including magnesium oxide and hydroxide reagents such as calcined Magnesite and Brucite. The activating reagent is added at varying levels and amounts to produce different density building products and materials. For example, if lintel type material is desired, requiring somewhat greater strength, the density of the fiber reinforced aerated concrete can be increased to 40–50 lbs. per cubic foot or greater. It is well known that the higher density of aerated concrete, the greater its compressive strength. Conversely, if light weight blocks and wall panels are desired, the activating reagent can be varied to produce material in the 30–40 lbs. per cubic foot range. As to the fly ash component, "C" and "F" ashes and mixtures thereof may both be employed although it is presently preferred to use class "F" fly ash.

Most preferably, a small amount of setting accelerator is also added to the cementitious slurry. At present, the preferred accelerator is sold under the trademark "Anti-Hydro" by Anti-Hydro Inc., Farmington, N.J. 08822. Reputedly, this product contains $CaCl_2$.

Also, a small amount of a thermal shrinkage control agent such as one or more of a variety of commercially available acrylic polymers may be added to the slurry to control thermal shrinkage during the initial cure of the mass. At present, we prefer to use "Duraweld" available from W. R. Grace for this purpose. This is a polyvinylacetate polymer and vinylacetate dibutylmaleate copolymer dispersion in water.

Mixing Process and Time Control

In the initial step, coal fly ash, cement, fiber and water are placed in a holding tank equipped with 'wave breaker' baffles located on the tank sides. The materials are mixed using a high-speed dispersion mixer with the appropriate horsepower and blade/tank diameter ratio. If desired, additional reagents such as lime, plaster of Paris and sodium silicate are also added to the mixture. The material is allowed to mix thoroughly for 2–5 minutes.

Fiber materials are added and mixing is allowed to continue for an additional 2–5 minutes to completely disperse the fibers. The activating reagents are added to the dispersion mixer and allowed to mix thoroughly with the other materials for an additional 1–4 minutes.

Following the mixing step, the activated mixture is placed into a mold for the aeration rise and curing. The transfer from the mixing tank to the mold should take place within about 5–6 minutes.

Mold Placement and Curing

The well mixed materials are placed in a large mold of at least 2'×2'×8' with solid sides and bottom panels and an open top. The bottom of the mold consists of a removable plate that is sealed to the sides of the mold during the curing stage, but can be removed along with the monolithic cementitious mass when the mold is opened. Molds of larger or especially longer dimensions may be utilized. Reinforcing wire or rod systems may be placed or 'hung' in the mold prior to addition of the activated panels of varying thickness. This allows for production of reinforced panels for roof, lintel or wall structures during the cutting and sizing production step.

The mass curing mold may be deeper, wider and longer than the specific mold construction noted above. In fact, the length may be about 20', the width may be about 4' and the height 3'. Alternately, column forms may be used with diameters as large as 3' and heights up to 8'.

Combining the activating reagents with high pH cement and other materials such as lime during the mixing process results in a chemical reaction that produces hydrogen gas. This gas is a result of reaction of the fine, well dispersed Al metal and, if present, magnesium oxide reagents. The hydrogen gas produced results in fine bubbles that cause the mixture to expand and 'rise' to completely fill the mold. This results in a light weight, 'cellular' structure to the material.

The in situ reaction is thought to proceed as follows:

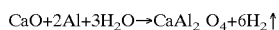

$$CaO+2Al+3H_2O \rightarrow CaAl_2O_4+6H_2\uparrow$$

Curing of the expanded mixture material proceeds as the Portland cement, fly ash and other reagents combine to produce stable calcium, magnesium and Al silicate compounds. These chemical reactions generate heat. Because of the large mass of material that is cured in the process, this heat is not completely dispersed and causes the temperature of the mixture in the mold to increase to between 150° F. and 180° F. When the mold is insulated, as with an insulated cover and sides, this elevated temperature is maintained for a period of 16–24 hours and greatly enhances the curing and strength of the product. Following curing in the mold for 16–36 hours, the mold is opened and the material is removed with a fork lift truck or overhead crane by lifting the mold floor along with the cured cementitious mass. The monolith is allowed to cure at ambient temperature for an additional 12–36 hours before moving to the cutting process.

Building Material Cutting Shaping

Following the curing step. The fiber reinforced cellular concrete monolith is cut into the appropriate building materials shapes. The initial step involves the use of a 'lumber mill' type band saw as abrasive wire, or rotary or circular "buzz saw" to cut the materials into panels with dimensions of 2'×8' and of any thickness from 1"–8" or thicker. Cutting the material with standard equipment causes acceptable wear on the saw blade due to the high fly ash content of the cementitious composition of the invention. It is well known that fly ash consists of very small ash 'spheres' that do not have sharp edges that dull the saw blade. However, AAC and many other types of cellular concrete utilize ground silica sand and attempting to cut such material would quickly dull the saw blade.

If reinforcing wire has been added to the mold prior to the curing process, the sawing proceeds in a manner to produce a panel with the reinforcing wire incorporated at the center of the panel. If the panels do not include reinforcing wire, additional cutting can be performed with a circular or band saw to produce blocks of virtually any size or dimension. Because of its light weight of 30–50 lbs. per cubic foot, the blocks produced can be relatively larger than conventional cement blocks and still be easily handled at the job site. Sawing the materials produces precisely sized building products that allow for rapid assembly at the construction job site.

The invention will be flier described in conjunction with the following examples that are not to be construed as limitations to the invention.

EXAMPLE 1

Composition

The mix is designed so that a cubic foot of finished product will weigh 28 pounds. The following materials make up the 28 pounds:

a) Water is added at the rate of 40% by weight of the dry ingredients. For 28 lbs. per cubic foot of finished product, water is added at 11.2 lbs. per cubic foot. The water combines with the ingredients in the various cementitious reactions and becomes part of the cured solid product matrix.

b) 60% (actually 59.3% or 16.6 lbs.) of the weight is coal fly ash.

c) 40% (actually 39.57% or 11.08 lbs.) of the weight is from Type I or Type II Portland Cement.

d) A very small percentage of the product weight is actually made up of the polypropylene fiber material 130 grams/cubic foot (0.29 lbs.) and at 20 grams/cubic foot (0.04 lbs.). These materials are combined according to the following process steps.

Mixing Process
1. Water at 40 C. is placed into a holding/mixing tank equipped with "wave breaker" baffles.
2. A high speed dispersion mixer with a 2000 rpm blade speed is lowered into the mixing tank.
3. Fly ash is added to the mixing tank and mixed for three minutes.
4. Cement is added to the mixing tank and mixed for three minutes.
5. Steps 3 and 4 may be combined into one three-minute mixing steps.
6. Additional reagents may be added at this point, including lime, plaster of Paris and sodium silicate and mixed for three minutes.
7. Fiber materials are added and mixed for three minutes.
8. Activator is added and mixed for two minutes.
9. The mixed slurry is transferred into the curing mold through a bottom discharge valve in the mixing tank.

EXAMPLE 2

Composition

The mix composition is designed so that a cubic foot of finished product will weigh 28 pounds. The following materials make up the 28 pounds:
a) Water is added at the rate of 40% by weight of the dry ingredients. For 28 lbs. per cubic foot of finished product water is added at 11.2 lbs. per cubic foot. The water combines with the ingredients in the various cementitious reactions and becomes part of the cured solid product matrix.
b) ~70% (actually 63.7% or 17.84 lbs.) of the weight is coal fly ash.
c) ~30% (actually 27.3% or 7.64 lbs.) of the weight is from Type I or Type II Portland Cement.
d) 2% lime (0.56 lbs.), 4% plaster of Paris (0.1.16 lbs.) and sodium silicate 1% (0.28 lbs.).
e) A very small percentage of the product weight is actually made up of the polypropylene fiber material 140 grams/cubic foot (0.31 lbs.), 140 grams/cubic foot of fiberglass fibers (0.31) and activator at 20 grams/cubic foot (0.04 lbs.). These materials are combined according to the following process steps.

Mix designs vary depending on the type and quality of the ash. The following preferred mix designs are based on a Class F fly ash from the Navajo generation station located in Page, Ariz.

EXAMPLE 3

Portland Cement Type I & II (Moderate alkali)—40%
Fly ash (Type F ASTM 618)—60%
Water to Cement Ratio—45%
Duraweld C—850 ml/cy
Antihydro—850 ml/cy
Al paste (Siberline)—1.18 lbs./cy
Alkali Resistant Glass Fibers—0.5%
Surfactant—0
Mix design by % weight of each component. At present this is the preferred mix. *Portland Cement shall meet ASTM C-150.
Mixing Process
1. Water at 40 C is placed into a holding/mixing tank equipped with "wave breaker" baffles.
2. A high speed dispersion mixer with a 2000 rpm blade speed is lowered into the mixing tank.
3. Fly ash is added to the mixing tank and mixed for three minutes.
4. Cement is added to the mixing tank and mixed for three minutes.
5. Steps 3 and 4 may be combined into one three-minute mixing step.
6. Additional reagents are added at this point, i.e., lime, plaster of Paris, sodium silicate, Duraweld™ and Antibydro™ and mixed for three minutes.
7. Fiber materials are added and mixed for three minutes.
8. Activator is added and mixed for two minutes.
9. The mixed slurry is transferred into the curing mold through a bottom discharge valve in the mixing tank.

Turning now to the drawings, there is shown a schematic process diagram highlighting the process steps utilized to make the fiber reinforced aerated concrete building structures in accordance with the invention. Portland cement or other hydraulic cementitious material is stored in silo 2 with fly ash stored in silo 4. Each of these components is fed through suitable metering valves 6, 8, into vat 10. Water is also added into the vat, and the temperature of the added water is carefully controlled. Temperature of the slurry is controlled to about 112–118° F. This controls the reaction of the Al and the rise of the product. It plays a key role in the ultimate temperatures that are obtained which are about 165–180° F. after nine hours of curing. These temperatures are obtained from a combination of the initial mix temperature and heat from hydration of cement and the heat of solution of calcium chloride. The ideal temperature curve is shown in FIG. 3.

The acrylic polymer is used as a buffer to keep the heat consistent and control thermal shrinkage. A high speed dispersion blade 12 is provided to operate at about 1500–2500 rpm. This blade is provided with baffle means around its periphery, and the inside of the vat may be provided with breaker baffles along its internal diameter.

The activator solutions are then added to the vat in the following manner. First, the setting accelerator and the thermal shrinkage control agent are added into the mixer with mixing continuing for about three minutes. Then, the Al paste activator is added and the resulting cementitious slurry is mixed for about 2.5 minutes. Next, fiberglass and/or polypropylene fibers are emptied into the vat.

The liquid slurry is then emptied into the five-sided metal mold form designated by the reference numeral 20 in the drawing. The form has an open top, and the liquid slurry is poured into the form so that it fills approximately about 50% of the volume of the form. A vibrator or other like means is utilized and placed in the liquid slurry so as to stir out air bubbles that may have formed in the slurry. This results in a more uniform cellular structure and helps to increase the strength of the finished product.

The slurry will take about 20–24 minutes to rise, and then it is allowed to set in the form for about 1.0–1.5 hours. Next, a concrete blanket or the like is placed over the mold form 20 so as to prevent moisture escape and inhibit heat loss to the environment. Thermocouples may be incorporated in the setting slurry to measure the temperature as the slurry is allowed to cure at ambient temperatures and pressures for a period of about 16–24 hours. Then, the sides 22, 24, 26, and 28 of the form are removed, leaving the fiber reinforced cellular concrete block 40 on the bottom portion of the form. The block itself may be in a dimension of 4'×20'×2', or in some pilot plants, we have made these blocks in forms of 2'×2'×8'.

The block 40 may then be fed to a sawing station which may comprise for instance a 16" bridge saw which will traverse longitudinally the block 40 to cut panels or slices from the block. Each panel 50 is then fed to another sawing station which, as shown, comprises a circular saw 52 which will cut the panel 50 transverse to its longitudinal direction to provide resulting blocks 60. Appropriate holes may be then drilled in each of the cementitious blocks 60 so as to provide for reception of reinforcing bars or the like therein during the construction of the appropriate building structure. Next, an assembly of blocks is placed on a pallet as shown at 70 in the drawings and the pallet is wrapped with shrink wrapping 80 or other vapor impervious means so as to maintain the moisture in the blocks to impart enhanced compressive strength to the blocks. We have found that the palletized blocks should be shrink wrapped for about three days so that they do not lose excess moisture and so that drying shrinkage problems are minimized.

In a full scale plant, we envision that the block 40 will be cut by a multiple head double arbor gang saw, and then the block 50 will be cut by a multiple head gang saw.

The blocks are then ready for use at the construction site. The block may be hand sawn, and screws, nails, bolts, and the like can readily be received and anchored in the surfaces.

Typical physical properties of fiber reinforced cellular concrete products are shown in Table 1.

TABLE 1

PHYSICAL PROPERTIES

|  | Type I | Type II |
|---|---|---|
| Compressive Strength (f'm), psi | 350 | 475 |
| Flexural Strength, psi | 60 | 80 |
| Dry Density, pcf | 32 +/− 1.5 lbs. | 39 +/− 1.5 lbs. |

Comparative studies with a conventional autoclave cured product are shown in Table 2.

TABLE 2

COMPARISON TO NOMINAL AUTOCLAVED AERATED CONCRETE

|  | Type I Invention | Type II Invention | Nominal AAC Autoclaved Aerated |
|---|---|---|---|
| Compressive Strength | 350 psi | 475 psi | 320–420 psi |
| Flexural Strength | 60–100 psi | 80–200 psi | 80–100 psi |
| Unit Weight | 32 lbs/ft3 | 39 lbs./ft3 | 30–35 lbs./ft3 |

The following Table 3 lists products that may be made with the inventive composition and methods described above. This list is for purposes of illustration and is not to be construed as a limitation to the invention.

TABLE 3

PRODUCT LIST

| Item No. | Item | Nominal Dimensions | | |
|---|---|---|---|---|
| | | Length | Height | Thickness |
| 1 | Masonry Units - Load Bearing | 24 inches | 8 inches | 8, 10, 12, inches |
| 2 | Masonry Units - Non-Load Bearing | 24 inches | 8 inches | 6, 8, 10, 12 inches |
| 3 | U-Block | 24 inches | 8 inches | 4, 6, 8, 10, 12, inches |
| 4 | Lintels | 6.5 feet, maximum | 8, 10, 12 inches | 4, 6, 8, 10, 12, inches |
| 5 | Wall Panel | 20 feet, maximum | 24 inches | 4, 6, 8, 10, 12, inches |
| 6 | Floor Panel | 20 feet, maximum | 24 inches | 4, 6, 8, 10, 12, inches |
| 7 | Roof Panel | 20 feet, maximum | 24 inches | 4, 6, 8, 10, 12, inches |

Presently envisioned equipment and mixing process parameters are as follows.

Mixing Equipment
  High Speed Dispersal Mixer
    75 hp
    1800–2000 rpm
    Dispersal Blade - 20" diameter
    Shaft - 3"
  Mixing Vat:
    Stainless Steel
    80-cf capacity → 600 gallons
    height - 6.5'
    diameter - 4.5'
    baffles on 3.5' centers
  Industrial Mixer (activator reagents)
    2 hp motor - paint style mixing blade
    Volumetric Capacity → 20 gallons or 2.7 cf
    Infeeds (admixture system)
    10 gallons of water
    10 lbs. of Al paste
    3 lbs. liquid admixture Mixing Process—Presently Preferred 1. Water is added to mixing vat. The temperature of the water varies depending on the temperature of fly ash and cement. This is how we at control a thermal balance of the materials and obtain an ideal curing curve (see attachment).
2. Mixer is turned on.
3. The cement and fly ash is added 10 seconds later and mixed for three minutes.
4. One minute into the three minute cycle, the Duraweld C and Antihydro admixtures are added to the cement slurry.
5. The activator mixer is turned on simultaneously with the batch mixer and ingredients are added: water, Al paste, and a possible surfactant for high carbon fly ash.
6. The activator slurry is then added to the batch at the end of the three minute cycle and mixed for two and a half minutes.
7. For the last 30 seconds of the mixing sequence, the Alkali Resistant Glass Fibers are added. If high flexural strengths are desired, then polypropylene fibers are added in place of glass fibers and are added at the same time as the Al.
8. Mixer is turned off.
9. Valve opens, material is poured out into a 20'×4'×2' form and valve is closed Mix formulations can vary extremely depending on the type and quality of the fly ash and hence each individual plant that produces the material. In some cases, it might be possible that additional concrete admixtures or minerals such as lime will need to be added to obtain the physical characteristics of our code approval ratings. Some of the chemicals and minerals that could be added to the mix, and should not be limited to these additives, are lime, plaster of Paris, brucite, magnesium oxide, sodium silicate, calcium aluminate, industry water reducers, accelerators polymers curing agents, and strength enhancers. The presently envisioned optimal formulations fall into the ranges as listed below.

|  | Range |
| --- | --- |
| Portland Cement Type I & II (Moderate alkali) | 30%–60% |
| Fly Ash (Type F ASTM 618) | 30%–80% |
| Water to Cement Ratio | 40%–50% |
| Duraweld C | 0.2%–1.5% |
| Anti-Hydro | 0.2%–2.0% |
| Aluminum Paste | 0.1%–0.22% |
| Surfactant | 0.02%–0.05% |
| Fibers | 0.05%–2.00% |
| Lime | 2%–4% |
| Plaster of Paris | 2%–4% |
| Brucite | 0.1%–0.5% |
| Magnesium Oxide | 0.1%–0.5% |
| Sodium Silicate | 0.25%–2.0% |
| Calcium Aluminate | 0.1%–1.25% |
| Industry water reducers | Dependent on particular product |
| Industry accelerators | Dependent on particular product |
| Industry polymers | Dependent on particular product |
| Industry curing agents | Dependent on particular product |
| Industry strength enhancers | Dependent on particular product |

*All percentages are based on the dry weight of the cement and fly ash.

It is apparent that the instant invention possesses distinct advantages that are of significant commercial interest. For instance, the following advantages are provided by the inventive compositions and methods herein set forth:

1. A light weight, cement/fly ash based, non-autoclaved aerated concrete that has the same physical properties as other manufactured AAC products.
2. A manufacturing process that produces the same amount and quality product as an AAC plant with only $\frac{1}{7}$th of the initial capital investment. A standard AAC plant can cost from $35–$40 million, while a plant utilizing the instant invention will only cost from $4.5–$5 million initial capital investment.
3. The ability to manufacture the product with any type or quality of fly ash. This is done similar to our carbon fixation process. The same type of surfactant is added, except that it can be done at the plant during the mixing process. The violent mixing action created by the dispersal mixer enables the plant's ability to receive non-treated fly ash that has a high carbon content (LOI).
4. A curing process to control thermal and drying shrinkage and enable the product to reach desire strengths. Sea ideal curing curve graph, FIG. 3.
5. The processing/cutting line. The modification of standard wood saw mill equipment to manufacture the various standard pieces, as well as customized pieces.

While certain features of this invention have been described in detail with respect to various embodiments thereof, it will, of course, be apparent that other modifications can be made within the spirit and scope of this invention, and it is not intended to limit the invention to the exact details shown above.

What is claimed is:

1. Autogenously curable aerated concrete composition comprising:
   (1) about 100 parts by weight of non-aqueous component, said non-aqueous components including
      (a) about 20–about 80 wt % fly ash;
      (b) about 10–about 60 wt % Portland cement;
      (c) about 0.001–about 2.00 wt % reinforcing fiber;
      (d) about 0.0001–about 2.00 wt % Al activating agent;
      (e) about 0.2–2.0 wt % of $CaCl_2$ accelerator; and
   (2) water, said water being present in an amount of about 20–about 60% based on said 100 parts by weight of said non-aqueous components.

2. Composition as recited in claim 1 wherein said Al activating agent comprises Al particles in a paste mixture.

3. Composition as recited in claim 1 further comprising as a non-aqueous component, a thermal shrinkage control agent (f) present in an amount of 0.2–about 1.5%.

4. Composition as recited in claim 3 wherein said thermal shrinkage control agent (f) comprises a polyvinylacetate polymer/vinylacetate dibutylmaleate copolymer dispersion.

5. Composition as recited in claim 1 wherein said fly ash comprises type "F" fly ash.

6. Composition as recited in claim 1 wherein said fly ash is present in an amount of about 45–70 wt %, said Portland Cement being present in an amount of about 25–50%, said fibers being present in an amount of about 0.005–0.020 wt %, and said Al activating agent being present in an amount of about 0.001–0.020 wt %.

7. Method for making a cementitious building material comprising providing the components of claim 1, mixing said non-aqueous components and water to form a cementitious mixture, placing said cementitious mixture into a mold having a volume of at least about 32 cubic feet, curing said cementitious mixture by autogenously heating in said mold at a temperature of about 150° F.–about 180° F. to form a cured material, removing said cured material from said mold and cutting said cured material into desired building material shapes.

8. Method as recited in claim 7 further comprising curing said mixture by autogenously heating said mixture in said mold at time and temperature conditions as shown in FIG. 3.

9. Method as recited in claim 7 further comprising, after said curing, forming an assembly of said cut building material shapes and wrapping said assembly with a vapor impervious means to maintain moisture in said cut building material shapes to impart enhanced compressive strength to said shapes, wherein said shapes are blocks or panels.

10. Method as recited in claim 9 further comprising, after said wrapping, allowing said wrapped assembly to set in said wrapped condition for at least three days.

11. Method for making an assembly of aerated concrete building shapes comprising
   a) providing non-aqueous components including fly ash, Portland cement, and foam activating agent;
   b) mixing said non-aqueous compounds with water to form a cementitious mixture;
   c) placing said cementitious mixture in a mold having a volume of at least about 32 cubic feet;
   d) autogenously heating said mixture in said mold at time and temperature conditions set forth in FIG. 3 to form a cured material;
   e) removing said cured material from said mold; and
   f) cutting said cured material from step e) into desired shape.

12. Method for making an aerated, cementitious building material comprising
   a) providing non-aqueous components including fly ash, Portland cement, and foam activator;

b) mixing said non-aqueous components with water to form a cementitious mixture;

c) placing said cementitious mixture in a mold having a volume of at least about 32 cubic feet;

d) curing said cementitious mixture by autogenously heating in said mold at a temperature of about 150–180° F. to form a cured material;

e) removing said cured material from said mold and cutting said cured material into desired building shapes.

13. Method as recited in claim 12 wherein said foam activator comprises an Al paste and a surfactant, and wherein said fly ash, Portland cement and water are pre-mixed to form a slurry, said method further comprising the step of controlling temperature of said slurry to about 112–118° F. to provide a temperature controlled slurry and then adding said foam activator to said temperature controlled slurry.

14. Method as recited in claim 13 further comprising adding $CaCl_2$ accelerator to said temperature controlled slurry.

15. Method as recited in claim 14 wherein said building shapes have compressive strengths of greater then about 350 psi and flexural strengths of from about 60–200 psi at densities of from 32 lbs. $ft^3$ to 39 lbs. $ft^7$.

* * * * *

UNITED STATES PATENT AND TRADEMARK OFFICE
CERTIFICATE OF CORRECTION

PATENT NO. : 6,773,500 B1
DATED : August 10, 2004
INVENTOR(S) : Creamer et al.

It is certified that error appears in the above-identified patent and that said Letters Patent is hereby corrected as shown below:

Column 10,
Line 1, delete "component" and substitute -- components --.
Line 32, delete "autogenously" and substitute -- autogenous --.
Line 42, delete "curing" and substitute -- cutting --.
Line 54, delete "compounds" and substitute -- components --.

Column 11,
Line 5, delete "autogenously" and substitute -- autogenous --.
Line 8, delete "c)" and substitute -- e) --.

Column 12,
Line 9, delete "then" and substitute -- than --.

Signed and Sealed this

Fourteenth Day of December, 2004

JON W. DUDAS
*Director of the United States Patent and Trademark Office*